US011852499B2

(12) United States Patent
Shao

(10) Patent No.: US 11,852,499 B2
(45) Date of Patent: Dec. 26, 2023

(54) MAP RENDERING METHOD AND APPARATUS, COMPUTER DEVICE, AND STORAGE MEDIUM

(71) Applicant: Tencent Technology (Shenzhen) Company Limited, Shenzhen (CN)

(72) Inventor: Yuewei Shao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 777 days.

(21) Appl. No.: 17/017,520

(22) Filed: Sep. 10, 2020

(65) Prior Publication Data

US 2020/0408558 A1    Dec. 31, 2020

Related U.S. Application Data

(63) Continuation of application No. PCT/CN2019/102035, filed on Aug. 22, 2019.

(30) Foreign Application Priority Data

Aug. 24, 2018    (CN) .......................... 201810971215.6

(51) Int. Cl.
*A63F 13/60*        (2014.01)
*G01C 21/36*        (2006.01)
(Continued)

(52) U.S. Cl.
CPC .......... *G01C 21/3635* (2013.01); *A63F 13/60* (2014.09); *G01C 21/32* (2013.01);
(Continued)

(58) Field of Classification Search
CPC ..................................................... A63F 13/60
See application file for complete search history.

(56) References Cited

U.S. PATENT DOCUMENTS

2008/0094395 A1    4/2008   Woo et al.
2013/0260846 A1   10/2013   Kruglick
(Continued)

FOREIGN PATENT DOCUMENTS

CN    103187003 A    7/2013
CN    103915033 A    7/2014
(Continued)

OTHER PUBLICATIONS

Tencent Technology, ISR, PCT/CN2019/102035, dated Nov. 27, 2019, 3 pgs.

(Continued)

*Primary Examiner* — Thomas H Henry
(74) *Attorney, Agent, or Firm* — Morgan, Lewis & Bockius LLP

(57) ABSTRACT

Embodiments of this application disclose a map rendering method performed at a terminal. The method includes: transmitting a block request to a native map module of the terminal through a three-dimensional display engine, the block request carrying a block identifier corresponding to a target field of view area; obtaining a block data address based on the block identifier through the native map module, and transmitting the block data address to the three-dimensional display engine; obtaining block data in the target field of view area based on the block data address through the three-dimensional display engine; invoking a target map interface through the native map module, to parse the block data, and generating map mesh data based on data obtained through parsing, the map mesh data including road data and building data; and performing map rendering based on the road data and the building data in the map mesh data.

20 Claims, 8 Drawing Sheets

(51) Int. Cl.
*G01C 21/00* (2006.01)
*G01C 21/32* (2006.01)

(52) U.S. Cl.
CPC ...... *G01C 21/3811* (2020.08); *G01C 21/3863* (2020.08); *G01C 21/3885* (2020.08)

(56) References Cited

U.S. PATENT DOCUMENTS

2013/0321442 A1* 12/2013 Van Os .................. G09G 5/00
345/582
2014/0149297 A1 5/2014 Den Herder et al.

FOREIGN PATENT DOCUMENTS

| CN | 104835202 | A | 8/2015 |
| CN | 104958900 | A | 10/2015 |
| CN | 104966315 | A | 10/2015 |
| CN | 105447101 | A | 3/2016 |
| CN | 105894563 | A | 8/2016 |
| CN | 106296813 | A | 1/2017 |
| CN | 107103072 | A | 8/2017 |
| CN | 107423445 | A | 12/2017 |
| CN | 107890671 | A | 4/2018 |
| CN | 108022285 | A | 5/2018 |
| CN | 108109204 | A | 6/2018 |
| CN | 109260708 | A | 1/2019 |
| JP | H 08262975 | A | 10/1996 |
| JP | 2002277257 | A | 9/2002 |
| JP | 2003114614 | | 4/2003 |
| JP | 2007133489 | A | 5/2007 |
| JP | 2013175191 | A | 9/2013 |

OTHER PUBLICATIONS

Tencent Technology, WO, PCT/CN2019/102035, dated Nov. 27, 2019, 5 pgs.
Tencent Technology, IPRP, PCT/CN2019/102035, dated Mar. 2, 2021, 6 pgs.
Anonymous, "Physically Based Rendering", Wikipedia, Aug. 7, 2019, XP055791538, 1 pg., Retrieved from the Internet: https://en.wikipedia.org/w/index.php?title=Physically_based_rendering&oldid=853376129.
Extended European Search Report, EP19852334.2, dated Apr. 13, 2021, 13 pgs.

* cited by examiner

MAP RENDERING METHOD AND APPARATUS, COMPUTER DEVICE, AND STORAGE MEDIUM

CROSS REFERENCE TO RELATED APPLICATIONS

This application is a continuation application of PCT Patent Application No. PCT/CN2019/102035, entitled "MAP RENDERING METHOD AND APPARATUS, COMPUTER DEVICE AND STORAGE MEDIUM" filed on Aug. 22, 2019, which claims priority to Chinese Patent Application No. 201810971215.6, entitled "MAP RENDERING METHOD AND APPARATUS, AND COMPUTER DEVICE" filed on Aug. 24, 2018, all of which are incorporated by reference in their entirety.

FIELD OF THE TECHNOLOGY

This application relates to the field of network technologies, and in particular, to a map rendering method and apparatus, a computer device, and a storage medium.

BACKGROUND OF THE DISCLOSURE

With development of terminal technologies, rendering of a gaming interface becomes a research focus of display technologies. For example, rendering a map in a mobile game is usually difficult because a rendering manner of a game conflicts with a rendering manner of an existing map component. Consequently, the existing map component cannot be directly used on a native side for rendering. Therefore, map rendering is usually performed by using the Unity engine in current game applications. However, performance of the Unity engine may cause stalling and a waste of memory during running, not only affecting a screen display effect, but also affecting normal running of a game.

SUMMARY

According to various embodiments provided in this application, a map rendering method and apparatus, a computer device, and a non-transitory computer-readable storage medium are provided.

The technical solutions are as follows:

According to an aspect, a map rendering method is performed by a terminal having a processor and memory storing a plurality of computer programs to be executed by the processor, wherein the plurality of computer programs include a three-dimensional display engine, a native map module, and a target map interface, the method comprising:

transmitting, when the three-dimensional display engine receives a mesh update instruction, a block request to the native map module through the three-dimensional display engine, the block request carrying a block identifier corresponding to a target field of view area;

obtaining a block data address based on the block identifier through the native map module, and returning the block data address to the three-dimensional display engine;

obtaining block data in the target field of view area based on the block data address through the three-dimensional display engine;

invoking the target map interface through the native map module, to parse the block data, and generating map mesh data based on data obtained through parsing, the map mesh data comprising road data and building data; and performing map rendering based on the road data and the building data in the map mesh data.

According to an aspect, a terminal is provided. The terminal includes a processor and a memory, the memory storing a plurality of computer programs including a three-dimensional display engine, a native map module, and a target map interface. The plurality of computer programs, when executed by the processor, cause the terminal to perform the method in the foregoing embodiment.

According to an aspect, a non-transitory computer-readable storage medium stores a plurality of computer programs including a three-dimensional display engine, a native map module, and a target map interface. The plurality of computer programs, when executed by a processor of a terminal, cause the terminal to perform the method in the foregoing embodiment.

Details of one or more embodiments of this application are provided in the following accompany drawings and descriptions. Other features, objectives, and advantages of this application will become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from the accompanying drawings without creative efforts.

DESCRIPTION OF EMBODIMENTS

To make objectives, technical solutions, and advantages of this application clearer and more understandable, this application is further described in detail below with reference to the accompanying drawings and the embodiments. It is to be understood that the specific embodiments described herein are merely used for explaining this application, and are not intended to limit this application. All other embodiments obtained by a person of ordinary skill in the art based on the embodiments of this application without creative efforts shall fall within the protection scope of this application. For convenience of understanding the embodiments of this application, some terms are explained herein.

Mesh data: During rendering, a mesh represents a drawable entity. A piece of mesh data includes at least a set of vertex data, and each vertex may include attributes such as coordinates and a normal vector. A piece of mesh data may alternatively include a piece of index data used for indexing vector data.

Shader: During rendering, the shader is a piece of instruction code applied to a graphics processing unit (GPU) and used for instructing the GPU to perform mesh rendering and generation of a rendering result, for example, calculate vertex transformation and calculate illumination.

Figure 1:
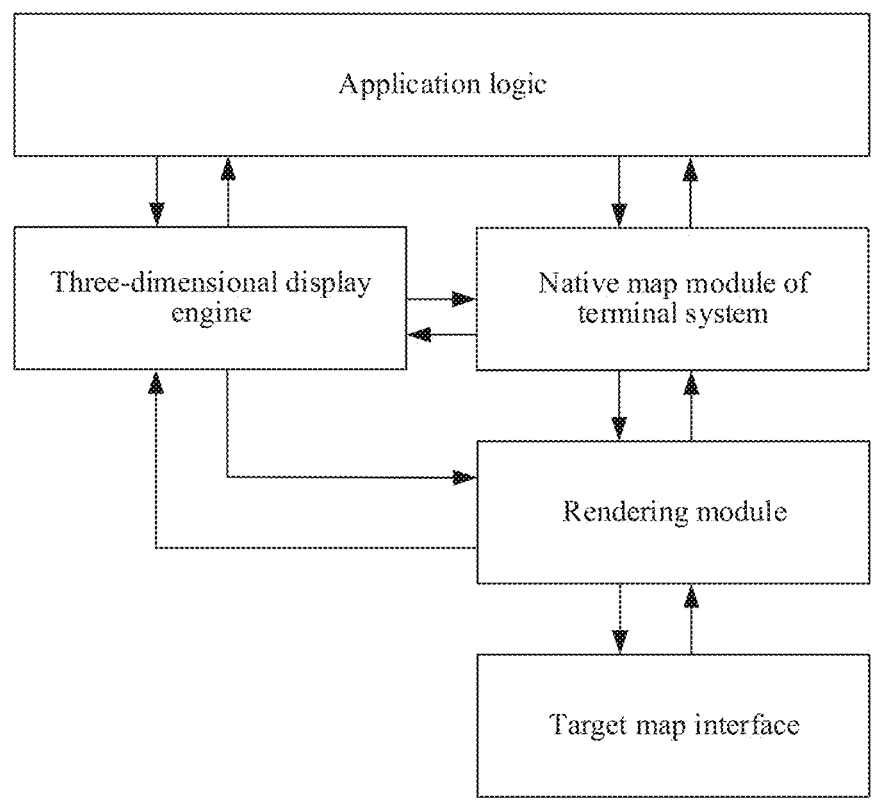
FIG. 1 is a diagram of an implementation environment of a map rendering method according to an embodiment of this application.

FIG. 1 is a diagram of an implementation environment of a map rendering method according to an embodiment of this application. Referring to FIG. 1, in the implementation environment, a terminal includes a three-dimensional display engine, a native map module (which may be, for example, in a form of a link library) of a terminal system, a rendering module, and a target map interface. The three-dimensional display engine may be a three-dimensional display engine that performs display based on application logic. For example, the three-dimensional display engine may be the Unity game engine. As a cross-platform general game engine, C#language is usually used for game logic development of the Unity game engine. The foregoing three-dimensional display engine may be a C#script part related to game logic, and this part is unrelated to the terminal system. The native map module may be a module implemented based on a computer language such as C++, and may be stored in the terminal system in a form of a link library, for the three-dimensional display engine to invoke. The rendering module may be implemented through a GPU, and can perform screen rendering according to mesh data bound by the three-dimensional display engine or the native map module, to display an interface on the terminal. The target map interface may be a map API, and is configured to access a target map server, to use any map data service provided by the target map server.

Figure 2:
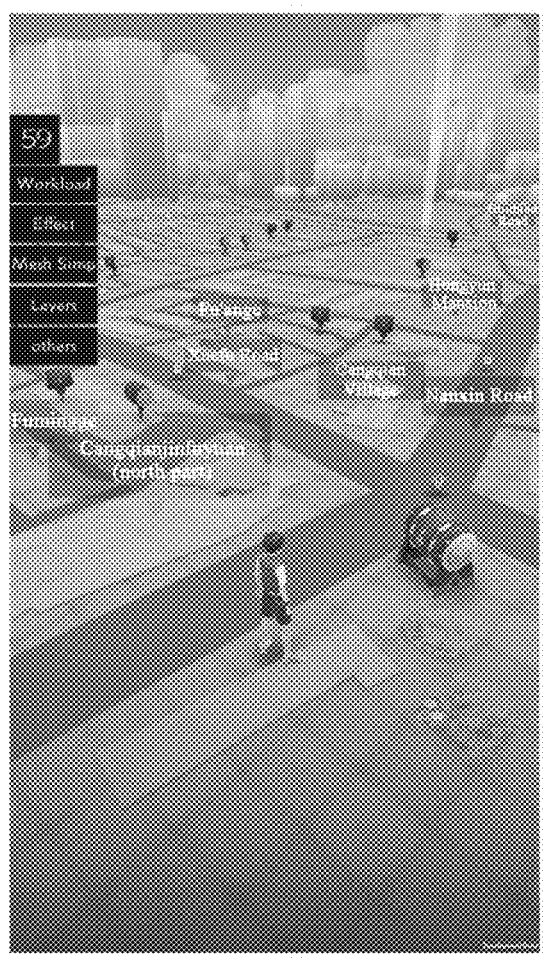
FIG. 2 is a diagram of a rendering effect according to an embodiment of this application.

A specific triggering relationship may exist between the three-dimensional display engine and the native map module. That is, when receiving a specific instruction, the three-dimensional display engine may trigger, through preset processing logic, the native map module to implement a specific step, to implement a rendering process through a linkage process between the three-dimensional display engine and the native map module, to achieve a rendering effect shown in FIG. 2.

Figure 3:
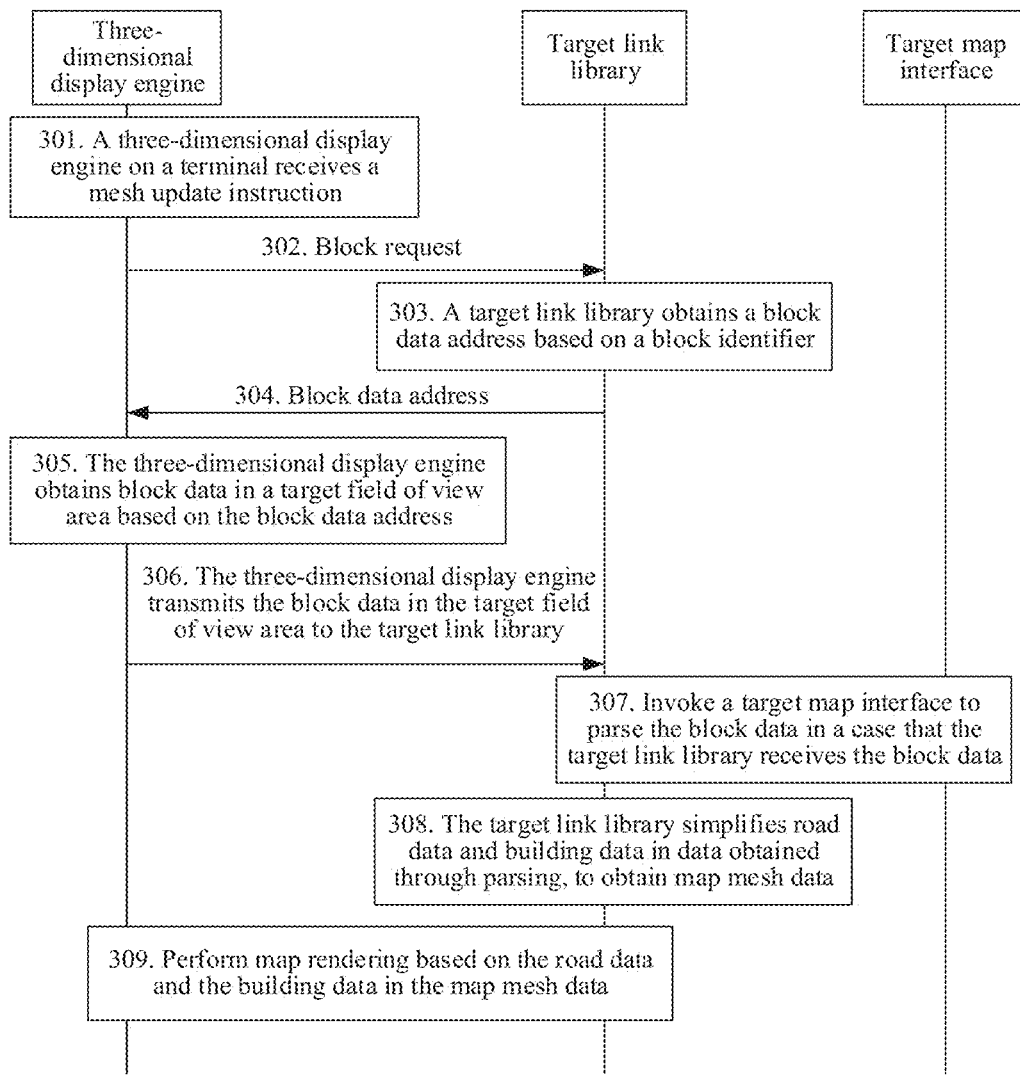
FIG. 3 is a flowchart of a map rendering method according to an embodiment of this application.

Based on an implementation environment provided in FIG. 1, FIG. 3 is a flowchart of a map rendering method according to an embodiment of the present disclosure. In this embodiment of the present disclosure, only an example in which a native map module is implemented through a target link library is used for description. Referring to FIG. 3, the method includes the following steps.

301. A three-dimensional display engine on a terminal receives a mesh update instruction.

The three-dimensional display engine may be a three-dimensional display engine provided by a game side, and may obtain relevant display data by reading a game configuration file, to display a gaming interface. The game configuration file may be stored on the terminal, or may be stored on a game server, and be read by the terminal by accessing the game server.

In this embodiment of this application, the mesh update instruction is an instruction for updating a map mesh. In some embodiments, the mesh update instruction may be a frame update instruction, that is, an instruction for updating a to-be-displayed image frame of the terminal. The mesh update instruction may be triggered based on that a player controls a virtual object or that a terminal logged in to by a player moves in the real world.

The foregoing update may be loading mesh data in a current field of view range and unloading mesh data outside the field of view range. For some games with relatively large game scenes, for example, in some games, a map needs to have a size range the same as that of the real world, but because a field of view range of a player is limited, when the player moves on the map, a map part entering the field of view range needs to be loaded dynamically, and a part outside the field of view range needs to be unloaded dynamically. Therefore, in some games, a map is equidistantly divided into two-dimensional meshes, as a player moves and a field of view range changes, a block in a mesh is dynamically loaded and unloaded.

302. The three-dimensional display engine transmits a block request to a target link library of a native system of the terminal, the block request carrying a block identifier corresponding to a target field of view area.

Figure 4:
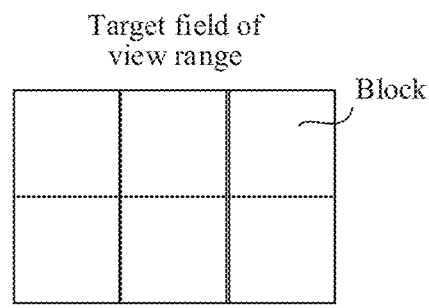
FIG. 4 is an exemplary diagram of a target field of view range implemented and provided according to an embodiment of this application.
Figure 5:
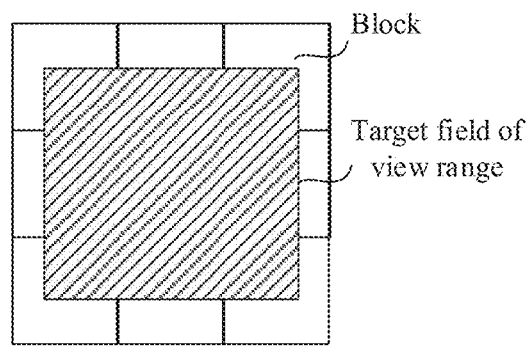
FIG. 5 is an exemplary diagram of a target field of view range implemented and provided according to an embodiment of this application.
Figure 6:
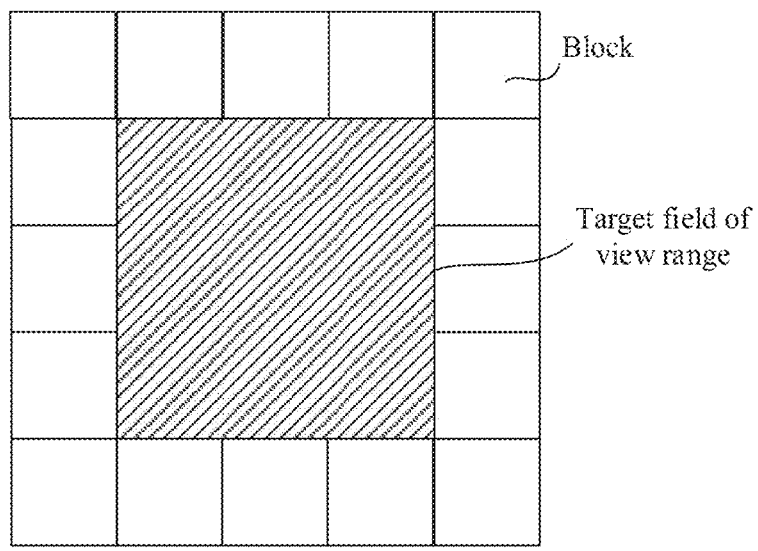
FIG. 6 is an exemplary diagram of a target field of view range implemented and provided according to an embodiment of this application.

In this embodiment of this application, when a currently displayed image frame needs to be updated, the three-dimensional display engine may first obtain the block identifier corresponding to the target field of view area according to current positioning information of the terminal. A block corresponding to the target field of view area may be a block in the target field of view area. That is, determined blocks indicated by the block identifier are all located in the target field of view range, and this is, for example, a case shown in FIG. 4, or at least one part of each of the determined blocks is located in the target field of view range, and this is, for example, a case shown in FIG. 5. The target field of view area may match a display area of the terminal in terms of a size and a shape, and certainly, may alternatively be slightly larger than the display area of the terminal, so that when a location of a user slightly changes subsequently, display can be performed quickly, to ensure continuity of display. That is, the block corresponding to the target field of view area may alternatively be a block in the target field of view area or an adjacent block in a specific area around the target field of view area, the specific area may be an area within a side length of one block, and this is, for example, a case shown in FIG. 6.

For example, the target field of view area may be a circular area with the positioning information as a center and a preset distance as a radius, to help a user observe geographic situations around when the user controls a virtual object to rotate. Certainly, the target field of view area may alternatively be a rectangular area. Certainly, the foregoing target field of view area may be determined in any determining manner. A shape of the determined target field of view area may also be determined according to user requirements or a system default, and is not limited in this embodiment of the present disclosure.

For the determined target field of view area, the three-dimensional display engine may obtain, according to geographic location information of the real world corresponding to the target field of view area, a block identifier of a block located in an area indicated by the geographic location information from the game configuration file. In the game configuration file, the block identifier and the geographic location information may be stored in a corresponding manner, so that corresponding block identifiers are accurately obtained according to the determined different pieces of geographic location information.

303. The target link library obtains a block data address based on the block identifier.

The target link library may store a preset splicing formula. The preset splicing formula may include an address splicing manner of the three-dimensional display engine service, and after the target link library obtains the block identifier provided by the three-dimensional display engine, address splicing may be performed on the block identifier according to the preset splicing formula, to obtain the block data address. Alternatively, the obtaining process of step 303 may be implemented through the following process: The target link library analyzes the block identifier, to obtain a block data address corresponding to each block identifier. With regard to which obtaining manner is adopted, no limitation is imposed in this embodiment of this application.

304. The target link library transmits the block data address to the three-dimensional display engine.

305. The three-dimensional display engine obtains block data in the target field of view area based on the block data address.

In this embodiment of this application, the three-dimensional display engine transmits a download request to the target server, the download request carrying the block data address; and receives the block data in the target field of view area transmitted by the target server. The target server may be a server providing a map data service for the three-dimensional display engine.

306. The three-dimensional display engine transmits the block data in the target field of view area to the target link library.

If the block data is loaded by the three-dimensional display engine, the three-dimensional display engine needs to process a large volume of data in a centralized manner, resulting in high time overheads. Therefore, in this embodiment of the present disclosure, this part is transferred to a native target link library of the terminal system for execution, to reduce a workload of the three-dimensional display engine and also avoid impact on normal running of a game application.

307. Invoke a target map interface to parse the block data in a case that the target link library receives the block data.

The target map interface is configured for association with a target map service, to enable the target link library to invoke the target map service through the target map interface, to parse the block data. The target link library usually does not have a capability of parsing block data. Therefore, the target map interface may be provided to enable the target map service to provide a parsing function, to parse the block data, so that the native target link library can participate in a rendering process of the three-dimensional display engine, thereby greatly reducing a processing burden of the three-dimensional display engine during the whole rendering process.

308. The target link library simplifies road data and building data in data obtained through parsing, to obtain the map mesh data.

The data obtained through the foregoing parsing process includes road data and building data. Roads may have a complex situation such as a bending or an intersection, and because the roads have different sizes, the road data may be simplified, and the simplification may specifically include at least one of the following processes:

(1) Scale up or down road sizes of the road data to a preset size, where the preset size may match the display area of the terminal, or the preset size may be a size preset by the system, so that the displayed road size may match a size of the display area of the terminal. Certainly, the preset size may alternatively be determined according to a scaling operation of a user on the terminal or a scaling ratio set by the user on the terminal, which is not limited in this embodiment of the present disclosure.

(2) Simplify intersections in the road data. A processing manner of the simplification is not limited in this embodiment of the present disclosure. An objective of the simplification is to reduce density of lines in the road data, thereby improving definition of display.

(3) Perform dimension reduction on road vertex coordinates in the road data, to obtain road vertex coordinates represented by a two-dimensional vector.

In this embodiment of this application, the data obtained through parsing by the target map interface includes road vertex coordinates and index data included in the road data. The road vertex coordinates are a three-dimensional vector and are used for representing coordinates of the vertex in three dimensions x, y, and z. However, in this embodiment of the present disclosure, a displayed road may not include ups and downs, and the road only needs to be displayed with an effect of being paved on the ground. Therefore, dimension reduction may be performed on the road vertex coordinates, and road vertex coordinates after the dimension reduction are represented by using a two-dimensional vector. That is, the road vertex coordinates after the dimension reduction only need to have two dimensions x and y.

Further, because three more floating point parameters are needed for game effect display, based on the road vertex coordinates after the dimension reduction and the three floating point parameters, a vertex may be represented by using a five-dimensional vector, which, compared with being represented in a form of a six-dimensional vector that is currently adopted, reduces an amount of processing.

The road data may include data such as lakes, grasslands, and roads, and is not specifically limited in this embodiment of the present disclosure.

Moreover, road materials include a shader used in road rendering and parameters needed by the shader, and in this embodiment of the present disclosure, are managed by the target link library of the native system of the terminal. Because dimension reduction has been performed on the vertex, the three-dimensional display engine cannot support data after the dimension reduction. Usually, the three-dimensional display engine supports only a three-dimensional or four-dimensional vector as a coordinate parameter, but in this embodiment of the present disclosure, vertex coordinates have been subjected to dimension reduction to become a two-dimensional vector. Therefore, the shader needs to be implemented on a native side, and shader parameters also need to be transmitted autonomously by the native side to a rendering side.

The building data may be simplified into building outline data and height data, so that a final displayed building does not need to be a complete picture of the building, and only a brief outline needs to be displayed, thereby improving rendering efficiency and also greatly reducing an amount of processed data in the whole processing process.

309. Perform map rendering based on the road data and the building data in the map mesh data.

The rendering process may be performed by an OpenGL device on the terminal, and the OpenGL device may perform rendering according to the road data and the building data bound by the three-dimensional display engine and/or the target link library. For a specific rendering procedure, reference may be made to the process in the following embodiment and the interaction process shown in FIG. 6.

In the method provided in this embodiment of this application, through data exchange between the target link library and the three-dimensional display engine, the map mesh data can be processed by the native target link library of the system replacing the three-dimensional display engine, so that the three-dimensional display engine does not need to process a large amount of data any more, and would not cause excessive time overheads, thereby avoiding stalling and a waste of memory during running and greatly improving a screen display effect without affecting normal running of an application. Particularly, for a functional component that has implemented map rendering on the native side, in the method provided in this embodiment, based on a rendering function, a rendering function on the native side is added into a rendering procedure of the three-dimensional display engine, to implement map rendering in a native layer, thereby achieving no-stalling experience.

In the rendering procedure shown in step 309, to make effects of rendered scenes better and prevent the rendered scenes from overlapping each other or being affected by other display effects, rendering may be performed based on the following principle: first rendering, during a rendering process, an object having transparency greater than target transparency, and then rendering an object having transparency less than the target transparency. For example, all opaque objects are to be rendered before all transparent objects. Because roads are opaque objects, a rendering order of the roads is higher, and because buildings are translucent objects, the buildings are rendered together with other translucent objects.

Figure 7:
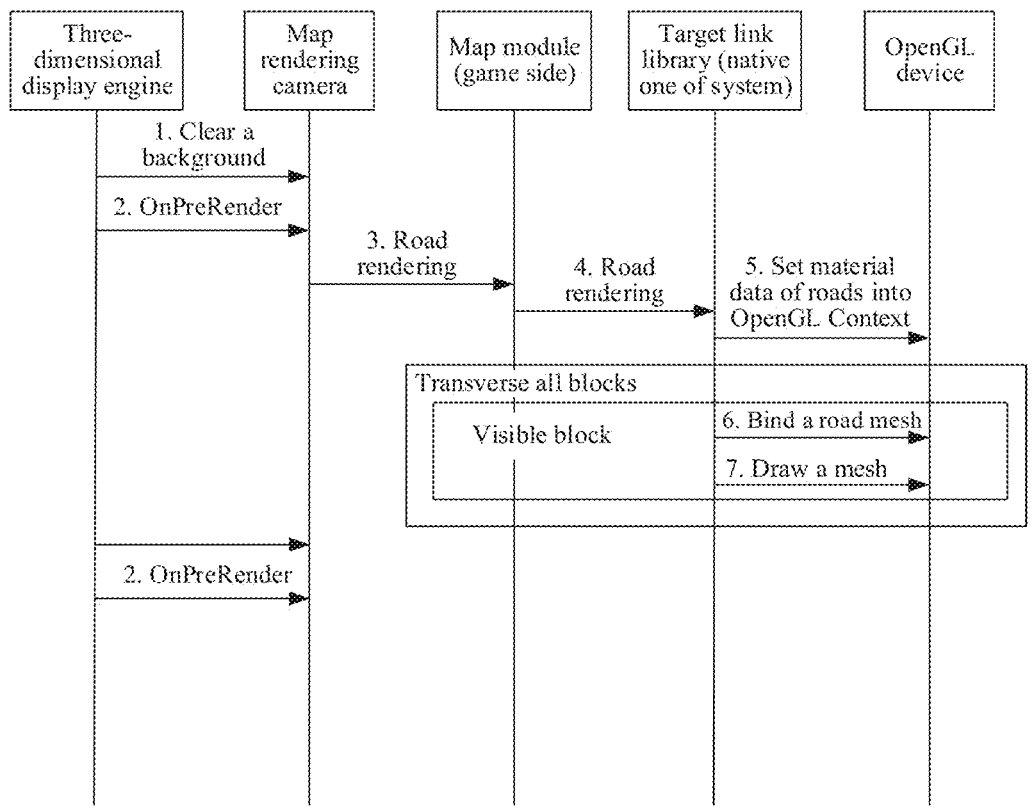
FIG. 7 is a flowchart of a rendering process according to an embodiment of this application.

To integrate map rendering into the rendering procedure of the three-dimensional display engine, a target script is added to a main scene camera. When the target script is run, if an OnPreRender event occurs in the camera, because roads are opaque objects, the terminal may render lakes, grasslands, and roads by invoking a road rendering interface on the native side, and if an OnPostRender event occurs in the camera, the terminal may render buildings on a map by using a building rendering interface on the native side. For specific processes, reference may be made to the procedure in FIG. 7.

1. The three-dimensional display engine clears a background. The three-dimensional display engine (Unity) clears a screen with a background color, and in addition, clears a depth buffer and a stencil buffer. Through the foregoing clearing process, rendering data, for example, context information of graphics rendering, that has been loaded previously may be cleared.

2. The three-dimensional display engine triggers an OnPreRender event function of a target script on a camera.
3. The target script of the camera triggers a road rendering function of a map module on a game side.
4. Trigger the target link library to perform road rendering.
5. The target link library sets material data of roads into OpenGL Context. The material data includes a shader and parameters needed by the shader.
6. The target link library transverses all blocks, and binds a road mesh for a block currently located in a field of view area of the camera into the OpenGL Context.
7. After the binding, the target link library notifies the OpenGL Context of performing drawing.
8. The three-dimensional display engine renders opaque objects in a scene (except the roads).
9. The three-dimensional display engine renders transparent objects in the scene (except buildings).
10. The three-dimensional display engine triggers an OnPostRender event function of the target script on the camera.
11. The target script on the camera triggers a building rendering function of the three-dimensional display engine.
12. The three-dimensional display engine sets building materials into the OpenGL Context.
13. The three-dimensional display engine triggers rendering on the buildings.
14. The target link library transverses all blocks, and binds mesh data in building data for the block currently located in the field of view area of the camera into the OpenGL Context.
15. After the binding, the target link library notifies the OpenGL Context of performing drawing.

In the foregoing processes, the target link library binds mesh data in the road data into context information of graphics rendering, and sets material data in the road data into the context information of the graphics rendering; and for the building data, the target link library binds mesh data in the building data into the context information of the graphics rendering, and the three-dimensional display engine sets material data in the building data into the context information of the graphics rendering. In the foregoing processes, rendering of a three-dimensional map can be implemented in the three-dimensional display engine to replace map rendering of the native sdk, to achieve more complex rendering effects. In addition, a mesh is updated on the native side of the system, to achieve higher performance and lower memory occupation.

Further, in this embodiment of this application, the rendering function is further upgraded and modified, so that when roads are rendered, road materials may be bound by using the target link library, and when buildings are rendered, rendering may be performed by using a material system of the three-dimensional display engine. Processing map data by the target link library is successfully embedded into rendering performed by the three-dimensional display engine, making it easier to achieve complex rendering effects.

It is to be understood that, the steps of the embodiments of this application are not necessarily performed according to a sequence indicated by step numbers. Unless explicitly specified in this application, the sequence for performing the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. The sub-steps or stages are not necessarily performed in sequence, but may be performed in turn or alternately with at least some of other steps or sub-steps or stages of the other steps.

In an embodiment, a terminal is further provided, where the terminal includes a map rendering apparatus, the map rendering apparatus includes modules, and each module may be entirely or partially implemented by using software, hardware, or a combination thereof.

Figure 8:
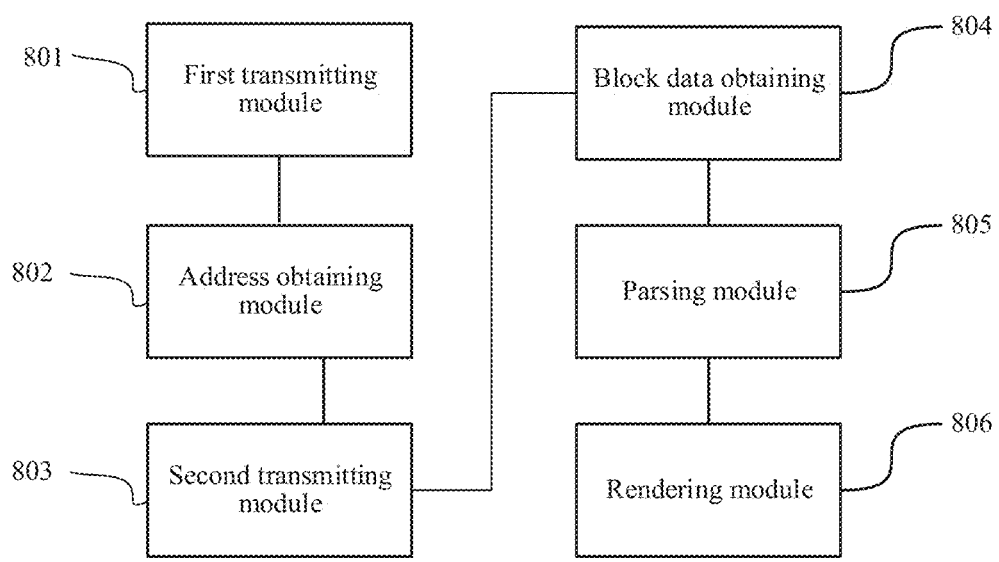
FIG. 8 is a schematic structural diagram of a map rendering apparatus according to an embodiment of this application.

FIG. 8 is a structural diagram of a map rendering apparatus according to an embodiment of this application. Referring to FIG. 8, the apparatus includes:

a first transmitting module 801, configured to transmit a block request to a native map module of a terminal system through a three-dimensional display engine in a case that a mesh update instruction is received, the block request carrying a block identifier corresponding to a target field of view area;

an address obtaining module 802, configured to obtain a block data address based on the block identifier through the native map module;

a second transmitting module 803, configured to transmit the block data address to the three-dimensional display engine;

a block data obtaining module 804, configured to obtain block data in the target field of view area based on the block data address through the three-dimensional display engine;

a parsing module 805, configured to invoke a target map interface through the native map module, to parse the block data, and generate map mesh data based on data obtained through parsing, the map mesh data including road data and building data; and a rendering module 806, configured to perform map rendering based on the road data and the building data in the map mesh data.

In some embodiments, the address obtaining module is configured to perform address splicing on the block identifier according to a preset splicing formula through the native map module, to obtain the block data address.

In some embodiments, the block data obtaining module is configured to: transmit a download request to a target server through the three-dimensional display engine, the download request carrying the block data address; and receive the block data in the target field of view area transmitted by the target server.

In some embodiments, the parsing module is configured to simplify, through the native map module, the road data and the building data in the data obtained through parsing, to obtain the map mesh data.

In some embodiments, the parsing module is configured to perform dimension reduction on road vertex coordinates in the road data through the native map module, to obtain road vertex coordinates represented by a two-dimensional vector.

In some embodiments, the rendering module is configured to: first render, during a rendering process, an object having transparency greater than target transparency, and then render an object having transparency less than the target transparency.

In some embodiments, the rendering module is configured to bind mesh data and material data in the road data to context information of graphics rendering through the native map module, and bind mesh data in the building data into the context information of the graphics rendering through the native map module, and bind material data in the building data into the context information of the graphics rendering through the three-dimensional display engine.

Figure 9:
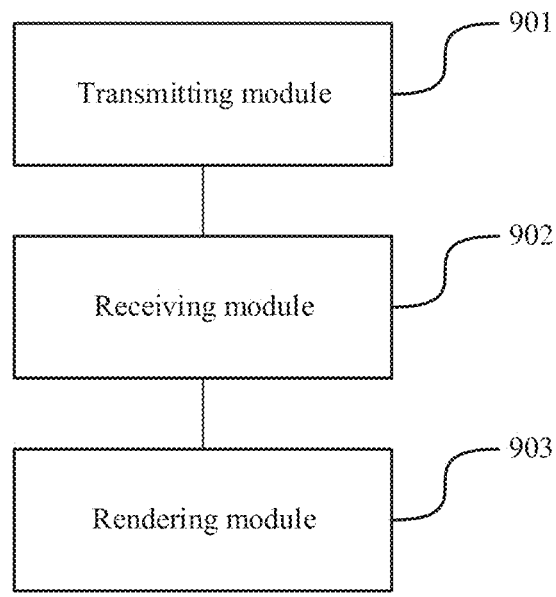
FIG. 9 is a schematic structural diagram of a map rendering apparatus according to an embodiment of this application.

FIG. 9 is a structural diagram of a map rendering apparatus according to an embodiment of this application. Referring to FIG. 9, the apparatus includes:

a transmitting module 901, configured to transmit a block request to a native map module of a terminal system in a case that a mesh update instruction is received, the block request carrying a block identifier corresponding to a target field of view area;

a receiving module 902, configured to receive a block data address obtained by the native map module based on the block identifier, the transmitting module 901 being further configured to obtain block data in the target field of view area based on the block data address, and transmit the block data to the native map module, the native map module obtaining map mesh data based on the block data, the map mesh data including road data and building data; and a rendering module 903, configured to perform map rendering based on the road data and the building data in the map mesh data in a case that a rendering instruction is received.

In some embodiments, the rendering module 903 is configured to set material data in the building data into context information of graphics rendering through the three-dimensional display engine, a graphics rendering interface performing map rendering based on the context information of the graphics rendering.

Figure 10:
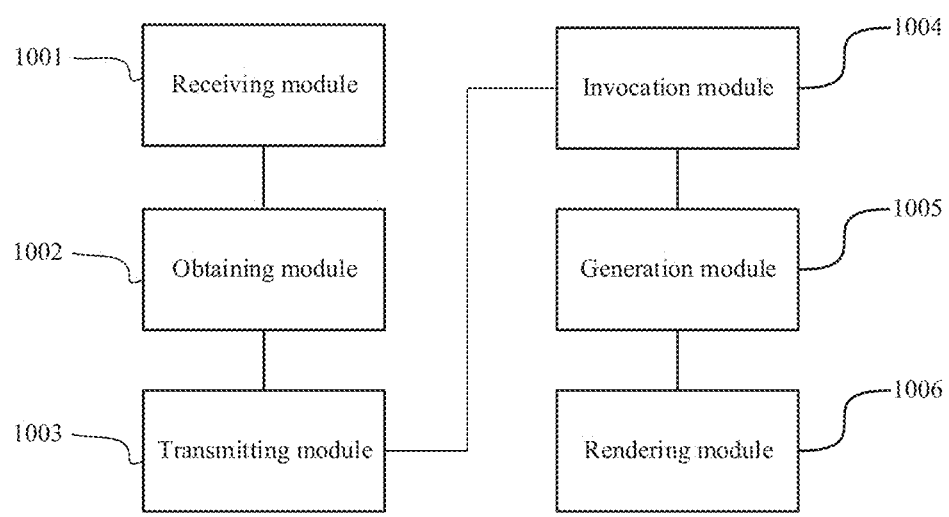
FIG. 10 is a schematic structural diagram of a map rendering apparatus according to an embodiment of this application.

FIG. 10 is a structural diagram of a map rendering apparatus according to an embodiment of this application. Referring to FIG. 10, the apparatus includes:

a receiving module 1001, configured to receive a block request transmitted by a three-dimensional display engine, the block request carrying a block identifier corresponding to a target field of view area;

an obtaining module 1002, configured to obtain a block data address based on the block identifier;

a transmitting module 1003, configured to transmit the block data address to the three-dimensional display engine;

the receiving module 1001 being further configured to receive block data obtained by the three-dimensional display engine based on the block data address;

an invocation module 1004, configured to invoke a target map interface to parse the block data;

a generation module 1005, configured to generate map mesh data based on data obtained through parsing, the map mesh data including road data and building data; and a rendering module 1006, configured to perform map rendering based on the road data and the building data in the map mesh data in a case that a rendering instruction is received.

In some embodiments, the rendering module 1006 is configured to set mesh data in the road data into context information of a graphics rendering interface through the native map module, and bind material data in the road data into the context information of the graphics rendering interface; and bind mesh data in the building data into context information of graphics rendering through the native map module, the graphics rendering interface performing map rendering based on the context information of the graphics rendering.

When the map rendering apparatus provided in the foregoing embodiments performs map rendering, only division of the foregoing function modules is used as an example for description. In the practical application, the functions may be allocated to and implemented by different function modules according to requirements. That is, an internal structure of the apparatus is divided into different function modules, to implement all or some of the functions described above. In addition, the map rendering apparatus provided in the foregoing embodiments and the embodiments of the map rendering method belong to one conception. For the specific implementation process, reference may be made to the method embodiments, and details are not described herein again.

Figure 11:
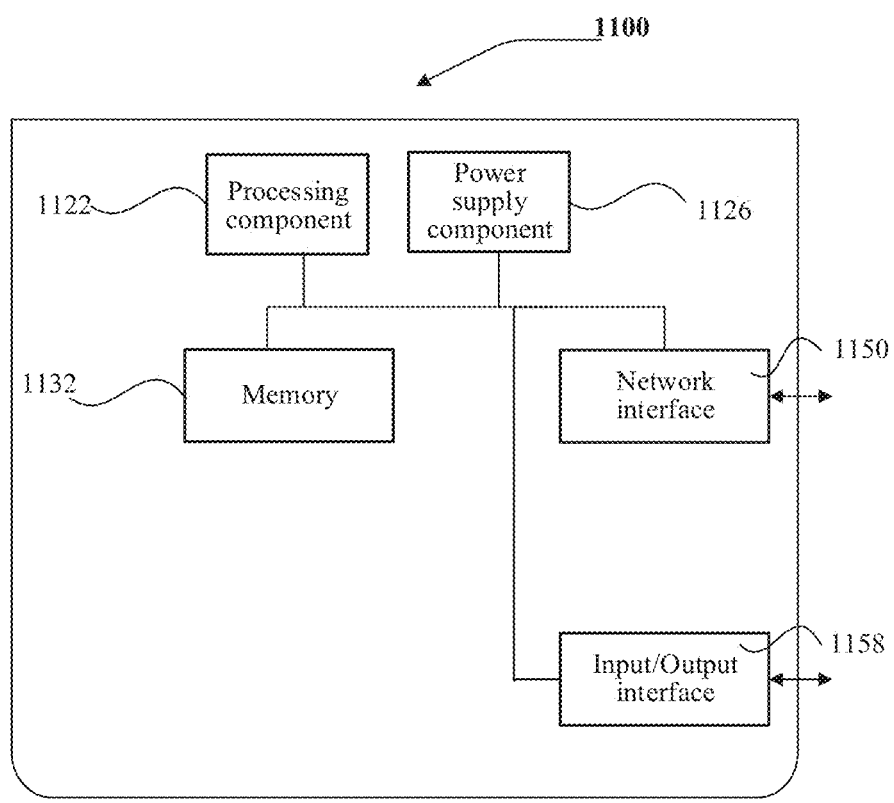
FIG. 11 is a block diagram of a computer device 1100 according to an exemplary embodiment.

FIG. 11 is a block diagram of a computer device 1100 according to an exemplary embodiment. Referring to FIG. 11, the computer device 1100 includes: a processing component 1122, further including one or more processors, and a memory resource represented by a memory 1132 and used for storing an instruction, for example, an application program, that can be executed by the processing component 1122. The application program stored in the memory 1132 may include one or more modules, each of which corresponds to a set of instructions. In addition, the processing component 1122 is configured to execute an instruction, to perform the foregoing map rendering method.

The computer device 1100 may further include: a power supply component 1126, configured to perform power supply management of the computer device 1100, a wired or wireless network interface 1180, configured to connect the computer device 1100 to a network, and an input/output (I/O) interface 1158. The computer device 1100 may perform an operation based on an operating system stored in the memory 1132, for example, Windows Server™, Mac OS X™, Unix™, Linux™, or FreeBSD™.

Figure 12:
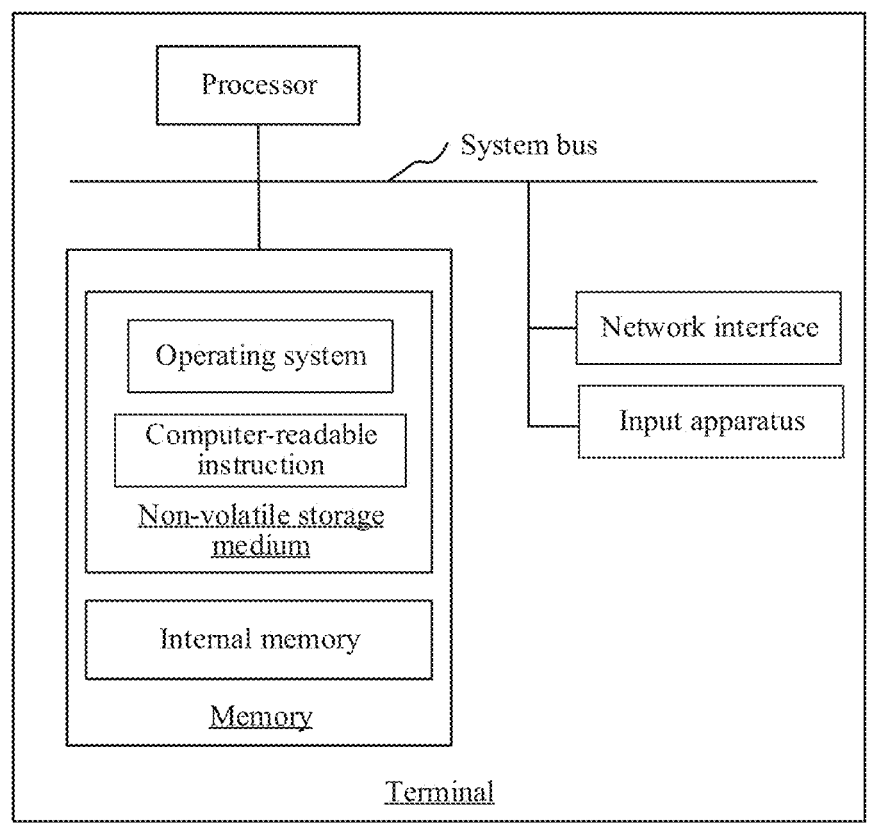
FIG. 12 is a diagram of an internal structure of a terminal according to an exemplary embodiment of this application.

FIG. 12 shows a diagram of an internal structure of a terminal according to an embodiment. As shown in FIG. 12, the terminal includes a processor, a memory, a network interface, and an input apparatus that are connected through a system bus and that are included by the computer device. The memory includes a non-transitory computer-readable storage medium and an internal memory. The non-transitory computer-readable storage medium of the terminal stores an operating system, and may further store a computer-readable instruction. The computer-readable instruction, when executed by the processor, may cause the processor to perform the map rendering method. The internal memory may also store a computer-readable instruction, and the computer-readable instruction, when executed by the processor, may cause the processor to perform the map rendering method. The input apparatus may be a touch layer covering a display screen, or may be a button, a trackball, or a touchpad disposed on a housing of the computer device, or may be an external keyboard, touchpad, mouse, or the like.

A person skilled in the art may understand that, in the structure shown in FIG. 12, only a block diagram of a partial structure related to a solution in this application is shown, and does not constitute a limitation on the terminal to which the solution in this application is applied. Specifically, the terminal may include more components or fewer components than those shown in the figure, or some components may be combined, or a different component deployment may be used.

In an embodiment, the map rendering apparatus provided in this application may be implemented in a form of a computer-readable instruction, and the computer-readable instruction may be run on the terminal shown in FIG. 12. The memory of the terminal may store various program modules constituting the map rendering apparatus, for example, a first transmitting module 801, an address obtaining module 802, a second transmitting module 803, a block data obtaining module 804, a parsing module 805, and a rendering module 806. A computer-readable instruction formed by the program modules causes the processor to perform the steps in the map rendering method in the embodiments of this application described in this specification.

An embodiment of this application provides a computer-readable storage medium, storing a computer-readable instruction, the computer-readable instruction being loaded and executed by a processor to perform operations performed in the map rendering method according to the foregoing embodiments.

A person of ordinary skill in the art may understand that all or some of the processes of the methods in the foregoing embodiments may be implemented by a computer program instructing relevant hardware. The program may be stored in a non-volatile computer-readable storage medium. When the program runs, the procedures of the foregoing method embodiments are included. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ES-DRAM), a synchronous link (Synchlink) DRAM (SL-DRAM), a Rambus direct RAM (RDRAM), a direct Rambus dynamic RAM (DRDRAM), and a Rambus dynamic RAM (RDRAM).

After considering the specification and practicing this application disclosed herein, a person skilled in the art would easily conceive of other implementations of this application. This application is intended to cover any variation, use, or adaptive change of this application. The variations, uses, or adaptive changes follow the general principles of this application and include common general knowledge or common technical means in the art that are not disclosed in this application. The specification and the embodiments are merely considered as examples, and the actual scope and the spirit of this application are pointed out by the following claims, It is to be understood that this application is not limited to the accurate structures that are described in the foregoing and that are shown in the accompanying drawings, and modifications and changes may be made without departing from the scope of this application. The scope of this application is limited by the appended claims only.

What is claimed is:

1. A map rendering method, performed by a terminal having a processor and memory storing a plurality of computer programs to be executed by the processor, wherein the plurality of computer programs include a three-dimensional display engine, a native map module, and a target map interface, the method comprising:

transmitting, when the three-dimensional display engine receives a mesh update instruction, a block request to the native map module through the three-dimensional display engine, the block request carrying a block identifier corresponding to a target field of view area;

obtaining a block data address based on the block identifier through the native map module, and returning the block data address to the three-dimensional display engine;

obtaining block data in the target field of view area based on the block data address through the three-dimensional display engine;

invoking the target map interface through the native map module, to parse the block data, and generating map mesh data based on data obtained through parsing, the map mesh data comprising road data and building data; and performing map rendering based on the road data and the building data in the map mesh data.

2. The method according to claim 1, wherein the obtaining a block data address based on the block identifier through the native map module comprises:

performing address splicing on the block identifier according to a preset splicing formula through the native map module, to obtain the block data address.

3. The method according to claim 1, wherein the obtaining block data in the target field of view area based on the block data address through the three-dimensional display engine comprises:

transmitting a download request to a target server through the three-dimensional display engine, the download request carrying the block data address; and receiving the block data in the target field of view area transmitted by the target server.

4. The method according to claim 1, wherein the generating map mesh data based on data obtained through parsing comprises:

simplifying, through the native map module, the road data and the building data in the data obtained through parsing, to obtain the map mesh data.

5. The method according to claim 4, wherein the simplifying, through the native map module, the road data and the building data in the data obtained through parsing, to obtain the map mesh data comprises:

performing dimension reduction on road vertex coordinates in the road data through the native map module, to obtain road vertex coordinates represented by a two-dimensional vector.

6. The method according to claim 1, wherein the performing map rendering based on the road data and the building data in the map mesh data comprises:

first rendering an object having transparency greater than target transparency, and then rendering an object having transparency less than the target transparency.

7. The method according to claim 6, wherein the first rendering an object having transparency greater than target transparency, and then rendering an object having transparency less than the target transparency comprises:

binding mesh data in the road data to context information of graphics rendering through the native map module, and setting material data in the road data into the context information of the graphics rendering; and binding mesh data in the building data into the context information of the graphics rendering through the native map module, and setting material data in the building data into the context information of the graphics rendering through the three-dimensional display engine.

8. A terminal, comprising a processor and a memory, the memory storing a plurality of computer programs including a three-dimensional display engine, a native map module, and a target map interface, the plurality of computer programs, when executed by the processor, causing the terminal to perform a plurality of operations including:

transmitting, when the three-dimensional display engine receives a mesh update instruction, a block request to the native map module through the three-dimensional display engine, the block request carrying a block identifier corresponding to a target field of view area;

obtaining a block data address based on the block identifier through the native map module, and returning the block data address to the three-dimensional display engine;

obtaining block data in the target field of view area based on the block data address through the three-dimensional display engine;

invoking the target map interface through the native map module, to parse the block data, and generating map mesh data based on data obtained through parsing, the map mesh data comprising road data and building data; and performing map rendering based on the road data and the building data in the map mesh data.

9. The terminal according to claim 8, wherein the obtaining a block data address based on the block identifier through the native map module comprises:

performing address splicing on the block identifier according to a preset splicing formula through the native map module, to obtain the block data address.

10. The terminal according to claim 8, wherein the obtaining block data in the target field of view area based on the block data address through the three-dimensional display engine comprises:

transmitting a download request to a target server through the three-dimensional display engine, the download request carrying the block data address; and receiving the block data in the target field of view area transmitted by the target server.

11. The terminal according to claim 8, wherein the generating map mesh data based on data obtained through parsing comprises:

simplifying, through the native map module, the road data and the building data in the data obtained through parsing, to obtain the map mesh data.

12. The terminal according to claim 11, wherein the simplifying, through the native map module, the road data and the building data in the data obtained through parsing, to obtain the map mesh data comprises:

performing dimension reduction on road vertex coordinates in the road data through the native map module, to obtain road vertex coordinates represented by a two-dimensional vector.

13. The terminal according to claim 8, wherein the performing map rendering based on the road data and the building data in the map mesh data comprises:

first rendering an object having transparency greater than target transparency, and then rendering an object having transparency less than the target transparency.

14. The terminal according to claim 13, wherein the first rendering an object having transparency greater than target transparency, and then rendering an object having transparency less than the target transparency comprises:

binding mesh data in the road data to context information of graphics rendering through the native map module, and setting material data in the road data into the context information of the graphics rendering; and binding mesh data in the building data into the context information of the graphics rendering through the native map module, and setting material data in the building data into the context information of the graphics rendering through the three-dimensional display engine.

15. A non-transitory computer-readable storage medium storing a plurality of computer programs including a three-dimensional display engine, a native map module, and a target map interface, the plurality of computer programs, when executed by a processor of a terminal, causing the terminal to perform a plurality of operations including:

- transmitting, when the three-dimensional display engine receives a mesh update instruction, a block request to the native map module through the three-dimensional display engine, the block request carrying a block identifier corresponding to a target field of view area;
- obtaining a block data address based on the block identifier through the native map module, and returning the block data address to the three-dimensional display engine;
- obtaining block data in the target field of view area based on the block data address through the three-dimensional display engine;
- invoking the target map interface through the native map module, to parse the block data, and generating map mesh data based on data obtained through parsing, the map mesh data comprising road data and building data; and
- performing map rendering based on the road data and the building data in the map mesh data.

16. The non-transitory computer-readable storage medium according to claim 15, wherein the obtaining a block data address based on the block identifier through the native map module comprises:

- performing address splicing on the block identifier according to a preset splicing formula through the native map module, to obtain the block data address.

17. The non-transitory computer-readable storage medium according to claim 15, wherein the obtaining block data in the target field of view area based on the block data address through the three-dimensional display engine comprises:

- transmitting a download request to a target server through the three-dimensional display engine, the download request carrying the block data address; and
- receiving the block data in the target field of view area transmitted by the target server.

18. The non-transitory computer-readable storage medium according to claim 15, wherein the generating map mesh data based on data obtained through parsing comprises:

- simplifying, through the native map module, the road data and the building data in the data obtained through parsing, to obtain the map mesh data.

19. The non-transitory computer-readable storage medium according to claim 18, wherein the simplifying, through the native map module, the road data and the building data in the data obtained through parsing, to obtain the map mesh data comprises:

- performing dimension reduction on road vertex coordinates in the road data through the native map module, to obtain road vertex coordinates represented by a two-dimensional vector.

20. The non-transitory computer-readable storage medium according to claim 15, wherein the performing map rendering based on the road data and the building data in the map mesh data comprises:

- first rendering an object having transparency greater than target transparency, and then rendering an object having transparency less than the target transparency.

\* \* \* \* \*